United States Patent Office 3,269,086
Patented August 30, 1966

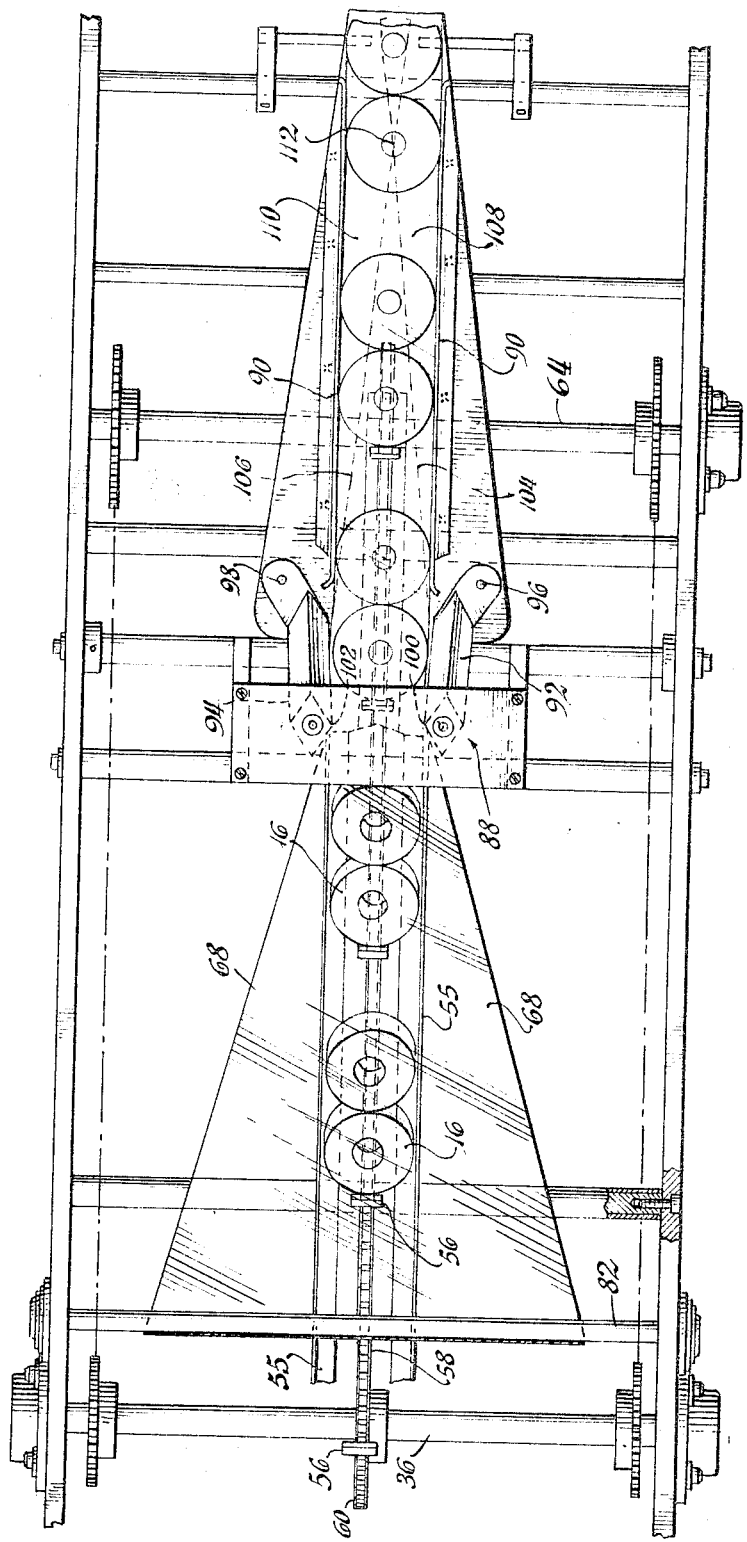

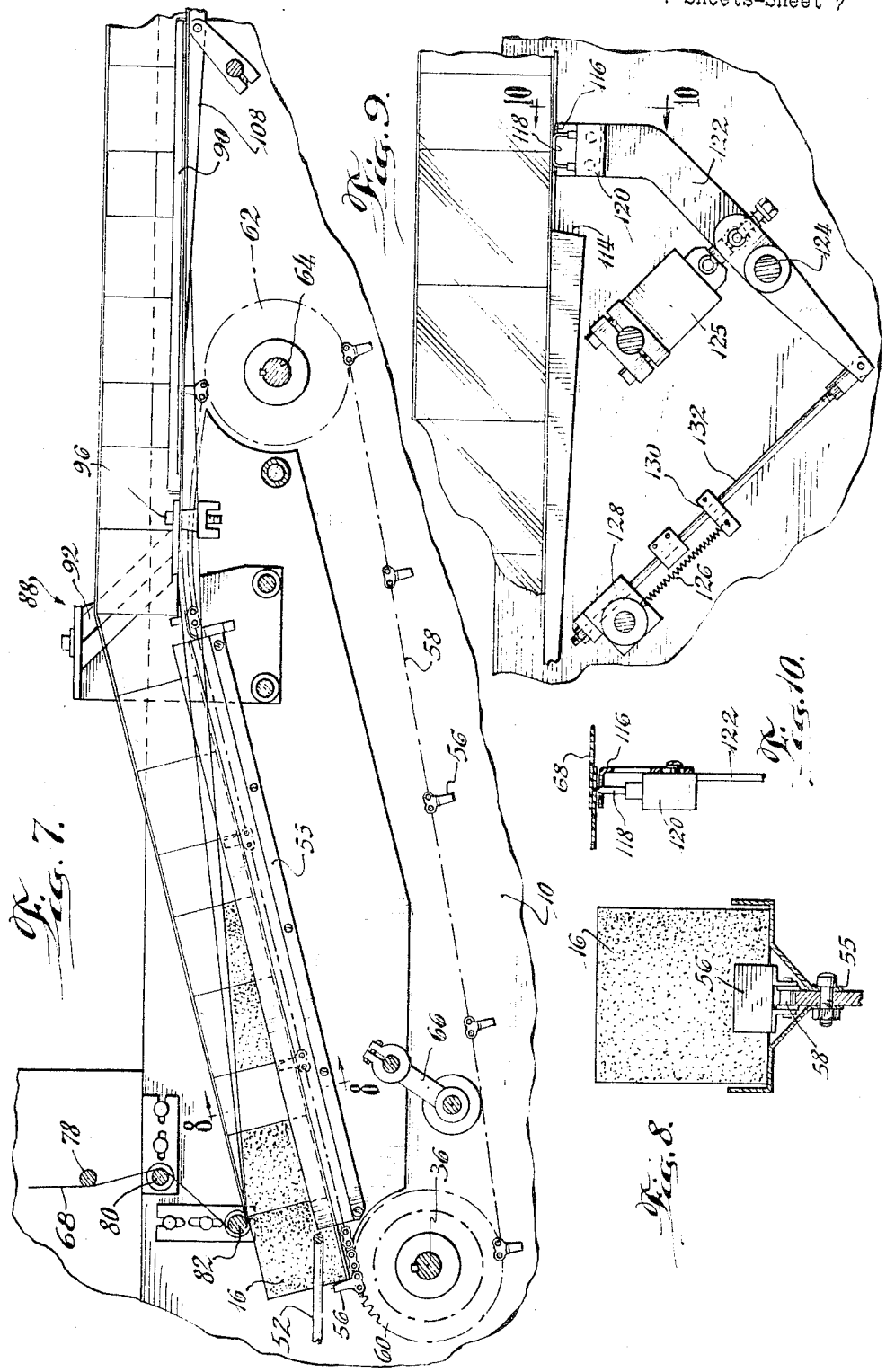

3,269,086
MACHINE FOR ENTUBING ARTICLES
Henry R. Cloots, Neenah, Wis., and Robert G. Nutting, Glenview, and Richard C. Wagner, Clarendon Hills, Ill., assignors, by direct and mesne assignments, to Kimberly-Clark Corporation, Neenah, Wis., a corporation of Delaware
Filed June 17, 1963, Ser. No. 288,290
7 Claims. (Cl. 53—180)

This invention relates to improvements in article wrapping mechanisms.

A primary object of the invention is to provide an improved method for continuously regrouping articles initially in end-to-end abutment as from a log cutter, by first repositioning the articles in spaced upright relation, then dividing the articles into paired groups, continuously enclosing said paired groups in a heat sealed film and thereafter sealing the film to provide a unitary assembly adapted to be further processed by downstream equipment.

Another object is to provide improved equipment incorporating the above method.

Other objects and advantages of the invention will become apparent to persons skilled in the art upon examination of the specification and drawings.

In the drawings, in which like parts are identified by the same reference numerals:

FIG. 6 is a plan view of a portion of the apparatus shown in FIG. 1.

FIG. 7 is a fragmentary elevation illustrating details of a portion of the apparatus shown in FIG. 1.

FIG. 8 is a section along line 8—8, FIG. 7.

FIG. 9 is an enlargement of a sealing unit shown in FIG. 1.

FIG. 10 is taken along line 10—10, FIG. 9.

Figure 1:
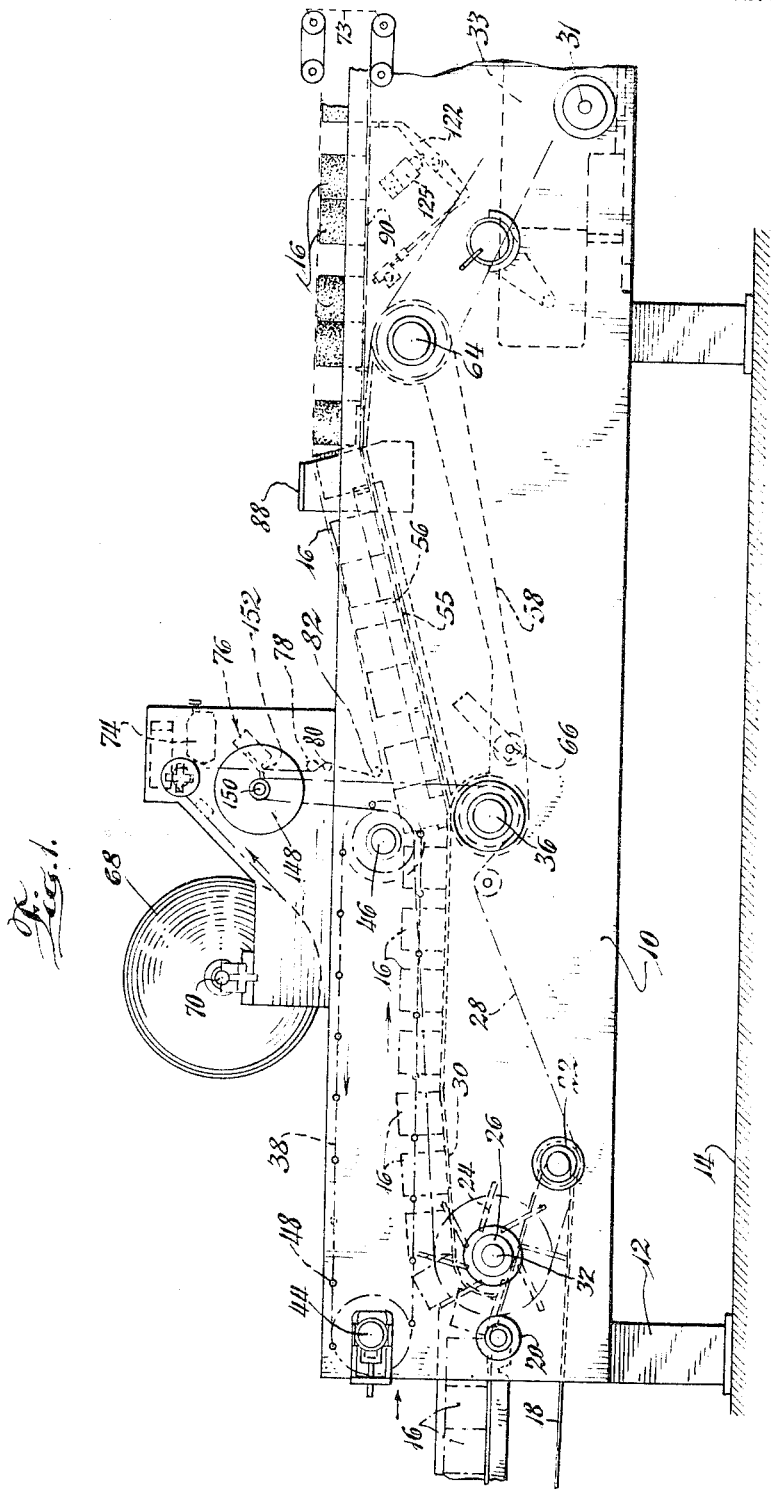
FIG. 1 shows in side elevation improved equipment incorporating the wrapping method taught herein.

The apparatus of FIG. 1 includes a framework 10 supported by posts 12 above a floor 14 and is adapted to receive a plurality of articles 16 continuously fed thereto from a suitable source of supply, not shown. The apparatus may be utilized for the wrapping of various light weight articles. FIG. 1 illustrates rolls of toilet tissue fed thereto in end-to-end relation as from the output of a so-called log cutter device, not shown, but well known in the art. Rolls 16 are horizontally fed in axial alignment in the downstream arrow direction by a plurality of suitable endless belts 18 continuously moving through a path defined by pulleys 20, 22, individually to feed rolls 16 between a pair of successively spaced spokes 24, of an up-ending device 26 continuously driven in a clockwise direction as shown by a chain 28. Device 26 functions to invert each roll 16 while effecting transfer thereof to a ramp-like fixed member 30, best shown in FIG. 2.

Figure 2:
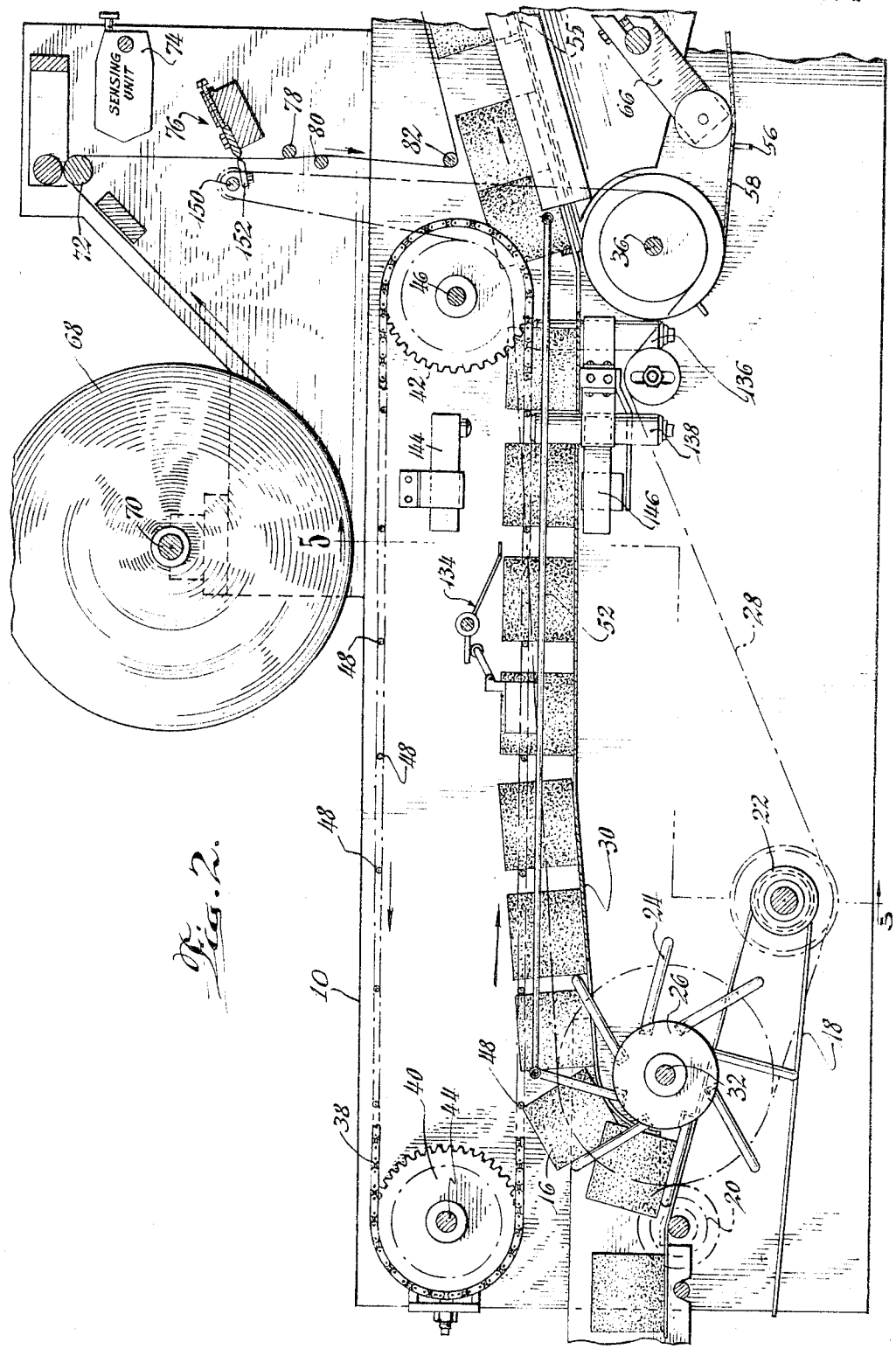
FIG. 2 is an enlarged fragmentary view in elevation, partially sectionalized, of apparatus shown in FIG. 1.
Figure 3:
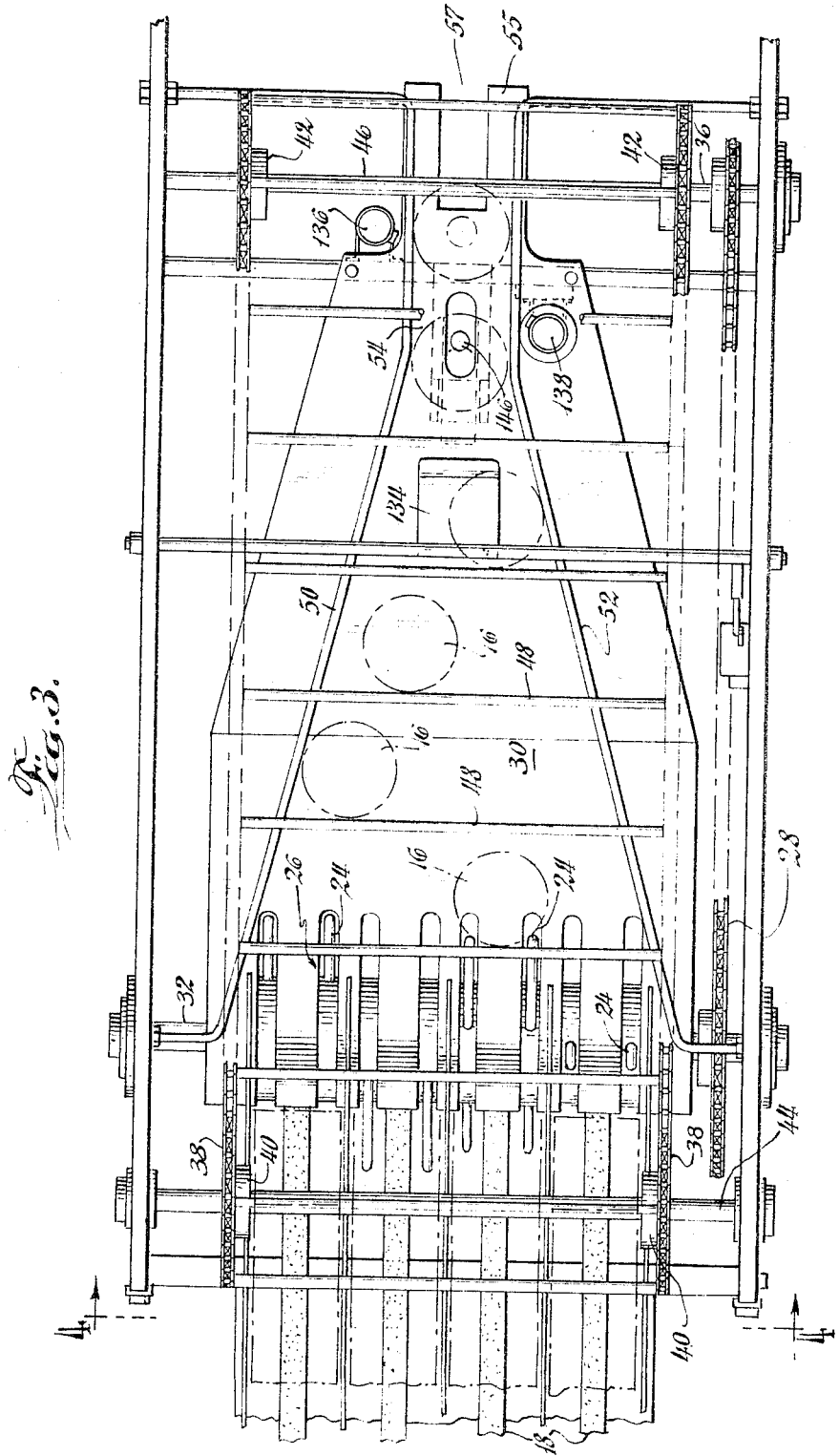
FIG. 3 is a plan view of the apparatus shown in FIG. 2.
Figure 4:
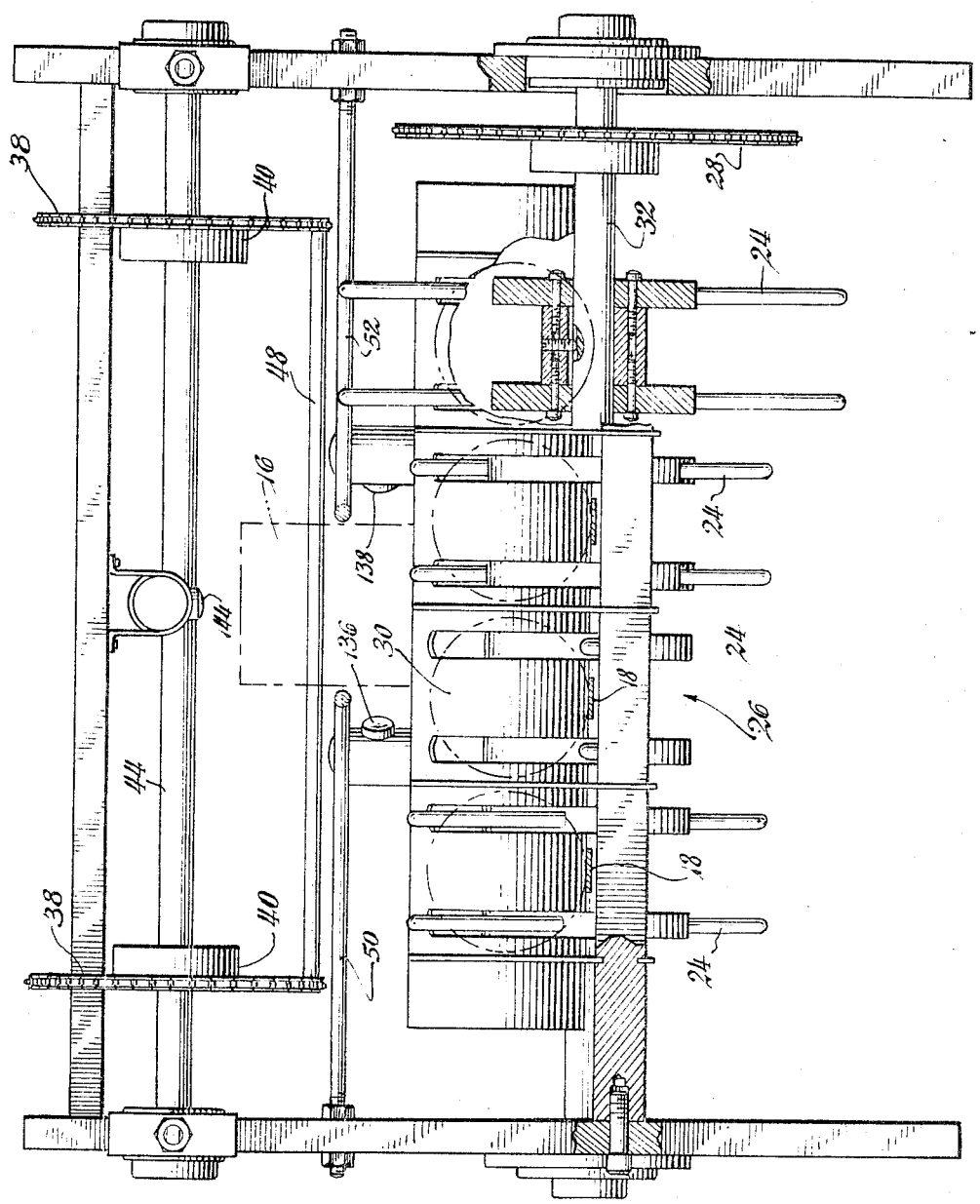
FIG. 4 is a vertical section taken along line 4—4, FIG. 3.

As shown in FIGS. 3 and 4, a plurality of rows of articles are adapted to be fed to the wrapper mechanism; provision having been made as shown for the infeeding of four rows of articles along four belts 18. As shown in FIGS. 1, 2 and 3, suitable pulley and chain drives interconnect the various units shown to effect synchronization thereof as driven from the output shaft 31 of a power device unit 33. Conveyor belts 18, FIG. 3, are driven at a speed sufficient to supply rolls 16 to up-ending device 26 as required, the belt speed being slightly in excess of a normal delivery speed based on roll length. Device 26, mounted on shaft 32, is driven by chain 28, as is belt 18 through sprocket 22.

Figure 5:
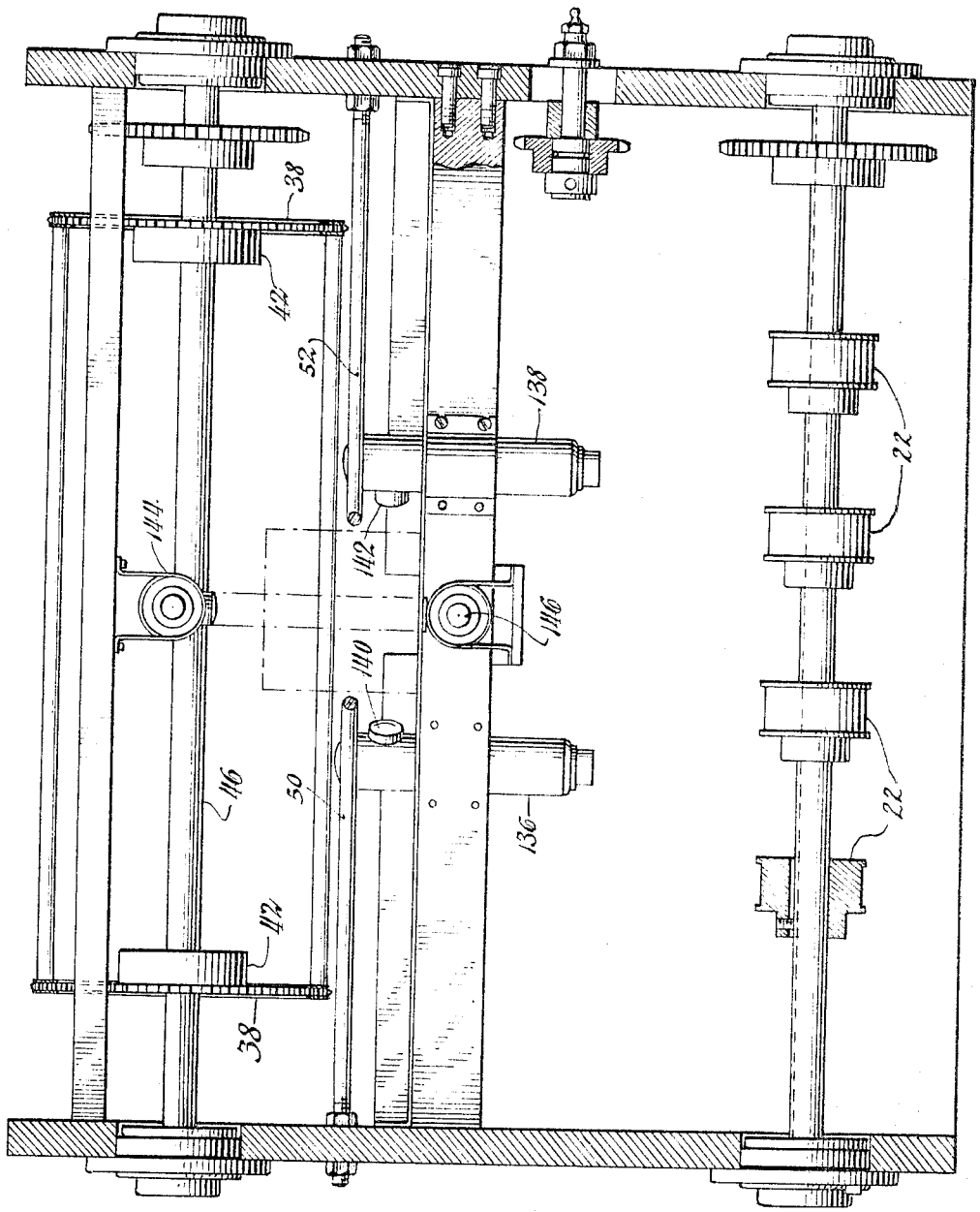
FIG. 5 is a vertical section along line 5—5, FIG. 2.

The individual rolls 16 are fed onto ramp 30 in staggered relation as controlled by circumferential offset between spokes 24 of the four individual up-ending units 26 mounted on shaft 32. As shown in FIGS. 2, 4 and 5, a pair of conveyor chains 38 move continuously between paired sprockets 40, 42 fixed to shafts 44, 46 respectively and carry rods 48, extending therebetween in equally spaced relation. Rods 48 move through the lower path portion in the downstream arrow direction as shown in FIG. 2 while properly spaced above ramp 30 to engage upper peripheral portions of tissue rolls 16 shortly after the feeding thereof onto ramp 30. As shown in FIG. 3, each rod 48 engages one roll to move it downstream at a constant speed. A pair of rod-like guide members 50, 52, FIG. 3, mounted to converge in a downstream direction, direct the rolls thus spaced and driven by rods 48 into a guideway 54 for single file alignment of rolls 16 during further travel downstream. Guideway 54 directs the rolls, in peripheral abutment, onto a second ramp 55 provided with a medial channel 57 through which a series of drive lugs 56 are drawn by chain 58. Chain 58 is driven from shaft 56 through a path of travel defined also by a sprocket mounted on shaft 36, and in part by ramp 55, over which it rides to carry grouped articles through station 88. Chain 58 is maintained under suitable tension by an idler device 66. Lugs 56 are suitably spaced to permit feeding therebetween of two rolls 16, the aft roll of which is contacted by lug 57 with the rolls of each pair in abutment as they move upwardly along ramp 55.

A roll of film type wrapping material 68, such for example as polyethylene film is mounted on shaft 70, FIG. 2, with the film fed over a guide pulley 72, optionally past a sensing unit 74, later described, and through a conventional perforating device 76, if desired. Film 68 is maintained tensioned between axially offset rolls 78 and 80 as it is drawn downwardly by articles entubed therein downstream of the position of initial application. As film 68 is drawn around guide roll 82 it is applied in sheet form over the upper ends of paired rolls 16, as best shown in FIG. 7. As film 68 is drawn further downstream in contact with the top surfaces of the moving paired rolls 16, marginal portions thereof may be downfolded without the aid of folding boards, the film being completely downfolded in inverted U configuration upon arrival of each pair of articles at station 88 for transfer from ramp 55 onto a horizontal guideway 90.

The mechanism herein taught comprises the upstream or input end of a unitary wrapping mechanism, the downstream end of which completes the enclosure and final sealing of each group of articles entubed by the improved method and equipment disclosed herein. The continuous assembly of entubed articles comprising the product output of this invention may be further processed by known types of mechanisms, but preferably by an improved mechanism shown and described in the co-pending U.S. patent application Serial No. 288,291, filed on June 17, 1963, by Robert G. Nutting and Richard C. Wagner. Said downstream mechanism will normally serve to maintain the entubed articles under tension while leaving the output end of the present equipment.

The required forward pull is illustrated as applied by a continuous belt conveyor 73 maintained in pressure engagement with the top wall of the article assembly and operative in the arrow direction continuously to move the assembly downstream at an even speed. Film 68, which is in flat form during passage under guide roll 82, is maintained by device 73 under tension and stretched over the uppermost roll pair as the latter arrives at the crest of ramp 55 and passes through station 88. It is important that conventional folding boards are not employed between guide roll 82 and the crest of ramp 55, and that the uppermost roll pair is utilized to serve as a form over which lateral portions of film 78 are drawn downwardly along the sides of the roll pairs by reason of the extent of the upward incline of ramp 55. Thus as film 68 progressively travels from guide roll 82 to station 88, the initially flat film is gradually formed into an inverted U-configuration with completion thereof over each roll pair at station 88 just prior to passing therethrough. By employing the uppermost roll pair as an elevated framework maintaining film 68 taut between guide roll 82 and the roll pair as the entire assembly is drawn downstream by unit 73, film wrinkling is minimized and a better product results. Results are superior to those obtained with conventional folding boards experimentally employed between guide roll 82 and the crest of ramp 55 to downfold the film. The uppermost roll pair in serving as a form constantly changes position within an acceptable range as the roll pairs pass through station 88, but such shift has been found actually to aid in proper downfolding of the film. Marginal portions of the film, then extending below the roll pairs, still require infolding over the bottom surface of said roll pairs to complete entubement thereabout.

Depending portions of film 68 passing through station 88 are aided in being maintained taut against each roll pair by a pair of support bars 92, 94 adjustably fixed by bolts 96, 98. Bars 92, 94 are positioned to insure pressure engagement of vertically positioned integral straight edge portions 100 and 102 against sidewall portions of the film. The primary function of bars 92, 94 is to insure parallelism and smoothness of the legs of said sidewall portions during pasage through station 88. As the film as formed over each roll pair is pulled through station 88 by unit 73, it is held taut against opposite sides of the paired rolls as it is urged thereagainst by straight edge portions 100, 102. When the apparatus is used to package compressible articles, such as toilet tissue rolls, bars 92, 94 are preferably adjusted to define an intervening space slightly less than the diameter of the rolls passing therebetween. Portions of the film which depend from the partially enclosed articles are thereafter directed along the inner margins 104, 106 of a pair of converging folding boards 108, 110. Boards 108, 110 effect folding of the free marginal portions of film 68 across the bottom surfaces of the roll pairs.

As shown in FIG. 7, prior to complete infolding of said marginal film portions, lugs 56 are withdrawn from article engagement as chain 58 moves down around guide pulley 62 at the downstream end of its conveyor path. During further downstream travel, the roll pairs are maintained properly spaced within the film which has been snugly applied about the top and sides thereof. Each roll pair is supported on marginal portions of folding boards 108, 110, with a film portion extending downwardly between the bottom surface of each roll and downwardly of the inner margins of the folding boards. As the substantially entubed roll pairs continue their downstream movement, the extending film portions are progressively drawn across the bottom surface of the rolls and toward each other, ultimately to arrive at a crossover position 112, FIG. 6. Boards 104, 106 are slightly vertically spaced, one from the other, and their edges 104, 106 thereafter progressively diverge downstream from position 112 sufficiently to effect a desired overlap of the infolded film portions.

As the entubed assembly is drawn downstream of the folding boards which terminate as shown at 114, FIG. 9, the longitudinally overlapped portion thereof passes over a centrally channeled support member 116, FIGS. 9 and 10 through which a wire-like heating element 118 extends upwardly in longitudinal alignment with the path of article travel. Element 118 is mounted by a suitable bracket 120 to the free end of a positioning arm 122 pivoted at 124 for movement to and from engagement with the article assembly. Arm 122 is actuated by a solenoid device 125 operating against the urge of a tension spring 126 mounted between a fixed bracket 128 and a bracket 130 fixed to a control rod 132 in slidable relation to bracket 128. Solenoid device 125, when energized, draws positioning arm 122 into the operative position of FIG. 9, but when de-energized spring 126 draws arm 122 into a retracted position, not shown.

As the marginally overlapped portions of film 68 continuously move over member 116, heating element 118, energized from a source not shown, effects interbonding of the overlapped film portions to complete the assembly of film entubed articles. Device 125 is associated in a known manner within a protective circuit which de-energizes the solenoid to allow the retraction of element 18 from the article assembly in the event of failure or shut down of the machine.

While the drawings show certain photo electric devices adapted both to insure proper registry between an indicia bearing film and the grouped articles being entubed, such devices are employed in a known manner, hence are only briefly described. As film 68 is drawn downstream around guide roll 72, and toward perforating device 76, a sensing unit 74, operatively associated with conveyor unit 73 and a variable speed drive unit not shown, maintains proper registry of the film in respect to the articles. A signal from unit 74 increases the speed of conveyor unit 73 over that of conveyor belt 58 to slip the film 68 over the articles disposed between guide roll 82 and device 73 sufficiently to bring the indicia of the film into registry with the articles. Control devices and circuits for effecting registry in the above manner are known in the art and form no part of the present invention.

As articles 16 are deposited on ramp 30, they thereafter move into contact with a cutoff device 134 which shuts down the apparatus in the event that the upstream mechanism fails to position an article between each of the spaced conveyor rods 48. As the articles are drawn further downstream, they intercept the path of a photo electric unit consisting of two pairs of photo cells. One photo unit shown at 136 and 138 serves to establish a beam between positions 140 and 142 and check proper horizontal alignment of articles 116. Another pair of photo units shown at 144 and 146 establishes a beam for registry with the open bores of the roll type articles 116 to check proper vertical alignment thereof before transfer onto ramp 55. Since employment of photo electric units for the above purposes is known, the details of mechanical structure and associated circuits is not described. When articles 16 arrive at the photo electric units non-aligned either in a horizontal or vertical plane, the unit operates to stop the machine, and sealing element 118 is concurrently withdrawn from contact with film 68 to avoid excess heating thereof and possible ignition of the entubed articles. If a perforating device 76 is employed an associated fly wheel 148 may be mounted to shaft 50 carrying cutter blade assembly 152 to provide the inertia required for smooth operation.

Various adaptations of the concepts herein taught will become apparent to persons skilled in the art without departure from the scope of the invention as defined in the following claims.

We claim:
1. In a machine for entubing generally cylindrical articles in a film-like material:
   (a) means for feeding to said machine multiple rows of axially aligned articles in end-to-end abutment,
   (b) means for upending each article so fed into a vertical position, with the articles of each row staggered transversely of articles of other rows,
   (c) a ramp positioned adjacent said upending means and leading downstream thereof and onto which said articles are deposited as upended,
   (d) spaced conveyor-driven elements extending transversely the said ramp and spaced above said ramp to engage and move articles downstream with each element engaging one ramp supported article, (e) and guide means converging in a downstream direction and positioned above said ramp for article contact therewith as driven by said conveyor elements, whereby plural articles from multiple infed rows are directed by said guide means into single file relation.

2. The device of claim 1 including:
(a) a medially slotted inclined ramp leading downstream from said guide means onto which aligned articles are fed by said conveyor-driven elements,
(b) a lug conveyor positioned below said inclined ramp for movement of the lugs thereof downstream while projecting upwardly through said ramp slot,
(c) the lugs of said conveyor being so spaced as to engage every second article for the conveyance of said articles, in paired abutment, up said inclined ramp.

3. The device of claim 2 including:
(a) means for feeding a film-like wrapping material of sufficient width to entube said articles along the upper surfaces of said articles as paired by said lug conveyor,
(b) said film being maintained under tension between a position adjacent the lower end of said ramp and a position at the crest of said ramp where the article pair are applied to said film, whereby lateral portions of said tensioned film, moving downstream at an upward incline, are drawn downwardly along the sides of said article pairs.

4. The device of claim 3 including:
(a) means for drawing said film and the partially entubed articles from the crest of said lug convey in a downstream direction with said film under tension,
(b) a pair of folding boards leading horizontally downstream of the crest of said inclined ramp to provide support for article movement thereover, and to effect infolding and overlapping of said film along the bottom surfaces of said paired articles.

5. The device of claim 4 including:
(a) means spaced downstream of said folding boards including a heating element in pressure contact with the overlapped portion of said film to effect a thermal bond between said overlapped film portions.

6. Packaging equipment including in combination:
(a) an article upending device comprising a plurality of article transfer elements mounted in axially spaced relation on a common driven shaft and each comprising a plurality of circumferentially disposed axially spaced and aligned pairs of spokes,
(b) said paired spokes of each element being circumferentially offset from the paired spokes of the other elements,
(c) a plurality of continuously driven conveyors upstream of and in parallel spaced relation to and aligned with said article transfer elements for feeding rows of articles in end-to-end relation to said transfer elements,
(d) and a ramp leading downstream of said article transfer elements upon which articles, fed downstream on said conveyors, and upended by said transfer elements, are deposited.

7. In a machine for entubing toilet tissue rolls or the like in a film-like material:
(a) means for in-feeding multiple rows of axially aligned rolls in end-to-end abutment,
(b) means for upending each roll so fed into a vertical position, with the rolls of each row positioned in transversely staggered relation to the upended rolls in other rows,
(c) a ramp positioned adjacent said upending means and leading downstream thereof onto which said rolls are deposited as upended,
(d) and a plurality of elements extending transversely of said ramp and spaced thereabove to engage and move said rolls downstream and continuously driven downstream at a uniform speed with each roll in driving engagement with one ramp supported roll.

References Cited by the Examiner
UNITED STATES PATENTS

| | | | |
|---|---|---|---|
| 1,527,337 | 2/1925 | Wilcox | 198—32 |
| 2,538,408 | 1/1951 | Baker et al. | 198—33.4 |
| 2,605,597 | 8/1952 | Scheib | 53—182 |
| 2,805,755 | 9/1957 | Jones | 198—34 |
| 3,007,295 | 11/1961 | Heinzer | 53—180 |
| 3,009,298 | 11/1961 | Garlach et al. | 53—180 X |
| 3,178,007 | 4/1965 | Standley et al. | 198—34 |

FRANK E. BAILEY, *Primary Examiner.*

S. ABEND, *Examiner.*